(No Model.)
H. H. TURNER & J. C. REICH.
LENS.
No. 539,370.   Patented May 14, 1895.
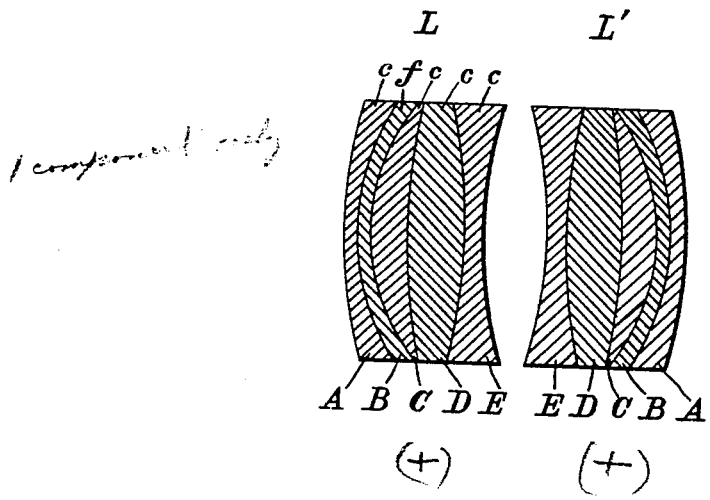
Witnesses:
Charles F. Logan.
C. G. Cranwell.
Inventors:
Henry H. Turner and
John C. Reich,
By Geo. B. Selden,
Atty.

UNITED STATES PATENT OFFICE.

HENRY H. TURNER AND JOHN C. REICH, OF ROCHESTER, NEW YORK, ASSIGNORS TO THE GUNDLACH OPTICAL COMPANY, OF SAME PLACE.

LENS.

SPECIFICATION forming part of Letters Patent No. 539,370, dated May 14, 1895.

Application filed February 15, 1895. Serial No. 538,537. (No model.)

*To all whom it may concern:*

Be it known that we, HENRY H. TURNER and JOHN C. REICH, citizens of the United States, residing at Rochester, in the county of Monroe, in the State of New York, have invented an Improved Lens, of which the following is a specification, reference being had to the accompanying drawing.

Our invention relates to the construction of an improved lens, designed principally for use in photography.

Our improved lens is fully described and illustrated in the following specification and the accompanying drawing,—the novel features thereof being specified in the claims annexed to the said specification.

In the accompanying drawing the figure is a central longitudinal section.

In our invention five lenses are combined together so as to produce a compound lens practically free from chromatic, spherical and astigmatic aberration. The quintuple lens thus formed is capable of being used singly for photographic work, or two such lenses may be combined to form a double objective, as indicated at L L', in the figure.

In the accompanying drawing we have represented a compound lens embodying our improvements, in which the separate lenses are described in the following table:

| Lens. | Thickness. | Radii of curvature. | Kind of glass. | Refractive index. |
|---|---|---|---|---|
| | Millimeters. | Millimeters. | | |
| A | 2.30 | 64.34 and 34.98 | Crown | 1.52 |
| B | 1.40 | 34.98 and 29.79 | Flint | 1.62 |
| C | 5.42 | 29.79 and 89.79 | Crown | 1.52 |
| D | 8.80 | 89.79 and 105.60 | ...do... | 1.60 |
| E | 1.76 | 105.60 and 63.36 | ...do... | 1.52 |

The diameter is 38.50 millimeters, distance from outside to outside of the double objective 49.20, and equivalent focus 279.40. The lenses are cemented together in the usual manner.

Lenses constructed substantially in accordance with the foregoing data will be found to be practically free from the defects mentioned.

C and D are the collecting lenses, and A B E the dispersing lenses. The construction admits of much latitude in the details of the various lenses, and also in the relative arrangement of the same.

The skillful optician will be able to produce a perfectly corrected lens by following the instructions herein given, and will also understand how to vary the details in adapting our improvements to larger or smaller objectives.

We claim—

1. The herein described compound lens consisting of the lenses A B C D E, having the curvatures and refractive indices substantially as herein set forth.

2. The herein described quintuple compound lens consisting of two collecting and three dispersing lenses, substantially as and for the purposes set forth.

3. The herein described quintuple compound lens, consisting of the outer convexo-concave crown-glass lens A, the convexo-concave flint-glass lens B, and the crown-glass lenses C D E, substantially as described.

4. The herein described quintuple compound lens consisting of the crown-glass collecting lenses C and D, having crown-glass dispersing lens E on one side and the flint and crown dispersing lenses B and A on the other side, substantially as described.

HENRY H. TURNER.
JOHN C. REICH.

Witnesses:
GEO. B. SELDEN,
C. G. CRANNELL.